United States Patent Office 2,864,666
Patented Dec. 16, 1958

2,864,666

PRODUCTION OF URANIUM TETRACHLORIDE

Vincent P. Calkins, Oak Ridge, Tenn., assignor, by mesne assignments, to the United States of America as represented by the United States Atomic Energy Commission No Drawing. Application December 13, 1950
Serial No. 200,691

9 Claims. (Cl. 23—14.5)

My invention relates to an improved chlorination method and more particularly to the conversion of uranium values to $UCl_4$.

In various processes, large quantities of $UCl_4$ are utilized as the starting material. In the course of such processes, certain waste uranium residues are collected from which the uranium is recovered in the form of such uranium values as $UF_6$, $UF_4$ or uranium oxides. However, in order to be suitable for return to the process stream, these compounds must be converted to substantially pure $UCl_4$. Considerable difficulty has been encountered in effecting such conversions.

One of the more satisfactory processes that has thus far been developed for converting $UF_6$ to $UCl_4$ comprises the multiple step process of dissolving $UF_6$ in $H_2O$, adding $NH_4OH$, and digesting to precipitate ammonium diuranate in accordance with U. S. Patent 2,466,118 issued April 5, 1949, separating the resulting precipitate, dissolving the precipitate in $HNO_3$, and precipitating substantially all the dissolved uranium as $UO_4$ by adding $H_2O_2$ in the presence of aluminum ions, calcining, and chlorinating the resulting uranium oxide to $UCl_4$ by methods such as are described in co-pending patent applications Serial No. 737,156, filed March 25, 1947, now U. S. Patent No. 2,756,124, issued July 24, 1956; Serial No. 91,425, filed May 4, 1949, now U. S. Patent No. 2,688,529, issued September 7, 1954; and Serial No. 98,164, filed June 9, 1949, now U. S. Patent No. 2,688,530, issued September 7, 1954. These chlorination methods generally comprise treating a uranium oxide at elevated temperatures with chlorinating reagents such as $CCl_4$ or hexachlorpropylene.

Still other processes for converting $UF_6$ to $UCl_4$ are disclosed in patent application Serial No. 659,853, filed April 5, 1946, now abandoned, and patent application Serial No. 182,134, filed August 29, 1950, now abandoned. These methods generally comprise reducing $UF_6$ to $UF_4$ with reagents such as silicon tetrachloride, thionyl chloride, phosphorus trichloride and trichlorethylene. The resulting $UF_4$ is then converted to the desired $UCl_4$ by calcining to a uranium oxide and subsequently chlorinating to $UCl_4$ as already indicated above.

It is noted that at least three major steps are required in the prior art to effect conversion from $UF_6$ to $UCl_4$, with a uranium oxide constituting an intermediate compound in these processes.

An object of my invention is to provide a suitable process for the production of $UCl_4$ from uranium values.

A further object is to provide an improved, shorter process for the production of $UCl_4$ from $UF_6$.

Another object is to provide an improved process for the production of $UCl_4$ from $UF_4$ and uranium oxides.

Additional objects and advantages of the present invention will appear from the following description.

In accordance with the present invention, $UF_6$ may be converted to $UCl_4$ by converting the $UF_6$ to $UF_4$ or $UO_2$, as described in the prior art, and the resulting $UF_4$ and/or $UO_2$, may be transformed directly to $UCl_4$ by contacting the $UF_4$ and/or $UO_2$ with relatively low melting inorganic chlorides such as $AlCl_3$, $BCl_3$ or $NaAlCl_4$ under substantially anhydrous conditions, in liquid-solid or vapor-solid states, and recovering the resulting $UCl_4$ from the resulting mixture by any suitable methods.

My method is particularly advantageous for the direct chlorination of $UF_4$ and $UO_2$, to form $UCl_4$ of generally satisfactory purity. However, tetravalent uranium compounds, in general, may satisfactorily be utilized in like manner. In addition, easily reducible hexavalent uranium compounds, such as $UF_6$, may be directly treated with the herein disclosed chlorinating agents to form $UCl_4$, $UF_6$ readily being converted to $UF_4$, and the resulting $UF_4$ converted to $UCl_4$, in accordance with my invention, by the remaining excess of chlorinating agent.

Other compounds containing uranium of valence greater than four may be converted to $UCl_4$, in accordance with my invention, but usually in relatively low yields. However, these yields may be considerably improved by reducing these compounds before chlorination, or by including a reducing agent in the chlorination reactions herein disclosed.

Since uranium oxides are readily available and uranium oxides other than $UO_2$ may be easily converted to $UO_2$ by conventional methods, and since $UF_4$ is a special problem in certain plant wastes in view of its extreme insolubility and general lack of reactivity, I will further illustrate my invention specifically with respect to $UF_4$ and $UO_2$.

Reactive uranium dioxide can be obtained, for example, by reduction of the higher oxides with methane, ammonia or ethanol below 750° C.; or by thermal decomposition of uranium (IV) compounds such as the sulfate, oxalate or benzoate. Uranium dioxide obtained in this way is a grey-black, pyrophoric powder which oxidizes rapidly in air. The coffee-brown dioxide prepared by reduction or thermal decomposition above 800° C. is much more inert.

My invention can be carried out either by a vapor-solid reaction in which a vaporized chlorinating agent is passed over a solid uranium compound at elevated temperatures or by a liquid-solid reaction at more moderate temperatures, in which the molten chlorinating agent is mixed with the solid uranium compound.

The temperature of any of the disclosed reactions is not critical, but rather is dependent upon the melting point or vaporization temperature of the specific chlorinating agent being utilized. Thus, if, in accordance with my invention, it is desired to effect a liquid-solid reaction, a temperature sufficiently high to melt the chlorinating agent must be utilized and correspondingly, a temperature sufficiently high to vaporize the chlorinating agent must be utilized to effect a vapor-solid chlorination reaction.

Only a slight excess over the stoichiometric quantity of chlorinating agent need be utilized in effecting the liquid-solid reactions, whereas, a considerable excess may be required for the vapor-solid reactions. However, in the latter, the excess is readily recoverable from the reaction products as described hereinafter.

Two general procedures are found satisfactory for carrying out these reactions. In one, the uranium values are placed in a vessel adapted to pressure and vacuum operation. The inorganic chlorinating agent is introduced and the vessel evacuated. The system is then heated until the chlorinating agent melts. Agitation may then be applied for a short period. After only a few minutes, the reaction appears to be complete, the reaction products remaining in the reaction mixture. However, approximately 15 minutes reaction time is preferred in order to assure an optimum yield. This method is particularly suitable when $AlCl_3$ is the chlorinating agent. When $NaAlCl_4$ is the chlorinating agent, a pressure vessel need not be utilized, but approximately 30% excess of $AlCl_3$ by weight should be added to the molten liquid to offset the loss of $AlCl_3$ by sublimation at the reaction temperature.

In another method, the chlorinating agent in the vapor state is passed over the solid uranium compound in a tube-like reactor at a temperature at least higher than the volatilization temperature of $UCl_4$ until substantially all the uranium compound is transformed into $UCl_4$. Excess chlorinating reagent and the resulting $UCl_4$ vapor may be condensed in a far section of the tube reactor and reheated to effect a distillation separation of the condensed material, the excess chlorinating agent being easily trapped for reuse. $AlCl_3$ and $BCl_3$ are particularly suited for this method, $BCl_3$ providing the extra advantage of producing no reaction products which are solids at the reaction temperature. My invention will be further illustrated by the following specific examples.

Example I to III illustrate unsuccessful attempts to produce $UCl_4$ from $UF_4$.

Example I

Two grams of $UF_4$ were triturated with 4 grams sugar charcoal and heated to 300° under nitrogen. Chlorine was then passed through the system and the temperature raised to 600–650°. Most of the brown-red volatile product obtained appeared by analysis to be a mixture of $UCl_5$ and $UCl_3F$.

Example II

Ten grams of $UF_4$ were placed in 20 ml. $SiCl_4$ in a steel bomb, the bomb then being chilled in liquid oxygen and the system evacuated. Even after heating the bomb to 243°, the reactants appeared unchanged, no evidence being present for the formation of any $UCl_4$, and the green solid remaining still analyzed as $UF_4$.

Example III

Twenty grams $PCl_5$ and 10.5 grams $UF_4$ were placed in a stainless steel bomb, the system being evacuated and then subject to 30 pounds of helium pressure. The bomb was then heated to 300° and maintained at that temperature for one hour. Upon cooling, no evidence for the formation of $UCl_4$ could be found; the $PCl_5$ appeared to have decomposed to some extent but the $UF_4$ did not appear to have undergone any appreciable change.

Examples IV to VIII illustrate successful attempts to produce $UCl_4$ from $UF_4$ and $UO_2$.

Example IV

The following procedure for a liquid-solid reaction, using $AlCl_3$ to convert $UF_4$ to $UCl_4$, was utilized:

Since $AlCl_3$ does not melt but sublimes at atmospheric pressure, this procedure was conducted in a bomb type reactor. Approximately 27 grams of $UF_4$ and about 40 grams of anhydrous $AlCl_3$ were placed in a 50 cc. reactor which was chilled, subjected to vacuum and sealed off. Then the reactor was heated in an oil bath to 215–230° C. until the $AlCl_3$ melted under its own pressure. A very dark but clear green solution resulted. After the solution had cooled and solidified, the resulting solid was crushed and subjected to a fractional distillation. The remaining $AlCl_3$ volatilized at about 200° C., the $UCl_4$ product sublimed at about 650° C., and the $AlF_3$ by-product remained behind as a relatively non-volatile residue.

Example V

About 29 grams of NaCl and approximately 66.5 grams of anhydrous $AlCl_3$ were mixed together (molar ratio of 1:1) and heated gradually until a molten liquid ($NaAlCl_4$) formed between 185–200° C. Approximately 20 grams excess of $AlCl_3$ were then added to the molten liquid to offset the gradual loss of $AlCl_3$ vapor while the temperature of the liquid was increased to about 300° C. 25 grams of solid $UF_4$ was then added to the liquid, the blue-green $UF_4$ changing rapidly into a dark green salt, most of which settled out of solution. The molten liquid was decanted off from the dark green residue, the residue by analysis was substantially pure $UCl_4$, contaminated slightly by occluded $NaAlCl_4$.

Example VI

The procedure of Example V was followed except that $UO_2$ was added to the molten liquid instead of $UF_4$. The product was substantially pure $UCl_4$.

Example VII

A procedure for a vapor-solid reaction using $AlCl_3$ for converting $UF_4$ to $UCl_4$ was as follows:

Purified nitrogen was passed over $AlCl_3$ at 300° C. and the resulting diluted $AlCl_3$ vapor was passed over solid $UF_4$ at 600 to 650° C. in a Vicor tube reactor. Both $AlCl_3$ and a green crystalline product condensed on the cool end of the Vicor tube. The condensed material was then heated at 350° C. and the $AlCl_3$ sublimed off leaving the green crystalline substance behind. Upon analysis, the green colored product proved to be $UCl_4$.

It may be noted that the excess $AlCl_3$ used in this reaction can be easily trapped and used again.

On a small scale, i. e., about 5 to 10 grams $UF_4$ with excess $AlCl_3$, this process proved very effective. However, some difficulty might be encountered in large scale operations, for non-volatile $AlF_3$ is formed during the reaction and might tend to form a coating over the hitherto unreacted $UF_4$, thus impeding further reaction of the tetrafluoride with $AlCl_3$. This difficulty may be circumvented by using thin layers of $UF_4$, or by using a rotating reactor tube.

The ideal chlorinating agent, in accordance with our invention, would be one which gives rise only to volatile reaction products, thus simultaneously increasing the reaction rate. The following example illustrates such a chlorinating agent.

Example VIII

Extremely pure $BCl_3$ was passed over five grams of $UF_4$ at 600° C. until all the $UF_4$ had reacted with the $BCl_3$ to form volatile products. Pure $UCl_4$ was separated from the reaction products by selective condensation, the remaining $BCl_3$ and the resulting $BF_3$ being considerably more volatile.

It is to be understood, of course, that the above examples are merely illustrative, and do not limit the scope of our invention. Other inorganic chlorinating agents and other reaction conditions may be substituted for those of the examples, in accordance with the foregoing disclosure. We find, in general, that inorganic chlorides capable of acting as either polar or non-polar substances, depending upon the circumstances involved, may be utilized in accordance with our invention to effect satisfactory conversion of uranium values to $UCl_4$. Thus, in general, it may be said that the use of any equivalents or modifications of procedure which would naturally occur to those skilled in the art is included in the scope of the present invention. Only such limitations should be imposed on the scope of our invention as are indicated in the appended claims.

What is claimed is:

1. A process for the production of $UCl_4$ which comprises contacting uranium values under substantially anhydrous conditions with at least one inorganic chloride selected from the group of inorganic chlorides consisting of $AlCl_3$, $BCl_3$ and $NaAlCl_4$ at a temperature and pressure such that said chlorides are maintained in at least the molten form, until said uranium values are substantially completely converted to $UCl_4$ and thereafter recovering $UCl_4$ from the resulting reaction products.

2. The process of claim 1 in which the uranium values are uranium fluorides.

3. The process of claim 1 in which the uranium values are $UO_2$.

4. The process of claim 1 in which the chlorinating agent is $AlCl_3$ and the temperature and pressure are such that the $AlCl_3$ is maintained in the molten state.

5. The process of claim 1 in which the chlorinating agent is $NaAlCl_4$ and the temperature and pressure are such that the $NaAlCl_4$ is maintained in the molten state.

6. The process of claim 1 in which the chlorinating agent is $AlCl_3$ and the temperature is such that the $AlCl_3$ is maintained in the vapor state.

7. The process of claim 1 in which the chlorinating agent is $BCl_3$ and the temperature and pressure are such that the $BCl_3$ is maintained in the molten state.

8. The process of claim 1 in which the chlorinating agent is $BCl_3$ and the temperature is such that the $BCl_3$ is maintained in the vapor state.

9. A process for the production of $UCl_4$ which comprises contacting uranium fluoride under substantially anhydrous conditions with $BCl_3$ at a temperature and pressure such that said $BCl_3$ is maintained in the vapor state until said uranium fluoride is substantially completely converted to $UCl_4$ and thereafter recovering $UCl_4$ from the resulting reaction products.

References Cited in the file of this patent

Handbook of Chemistry and Physics, 26th ed., pp. 332–3 (1942), publ. by Chemical Rubber Publ. Co., Cleveland, Ohio.

Katz et al.: The Chemistry of Uranium, pp. 472, 473, 509, 511 (1951), publ. by McGraw-Hill Book Co., N. Y. C. (Notes CEW–TEC 19 and 20, and UCRL 26, show dates of January 1946 and earlier.)

Anonsen et al.: The use of Aluminum Chloride in the Determination of the Total Uranium Content of Uranium Tetrafluoride, AEC declassified document, AECD 2169, declassified July 23, 1948. Available from U. S. Atomic Energy Commission.